Dec. 28, 1926.
A. L. PUTNAM
VEHICLE WHEEL
Filed April 7, 1924
1,612,050
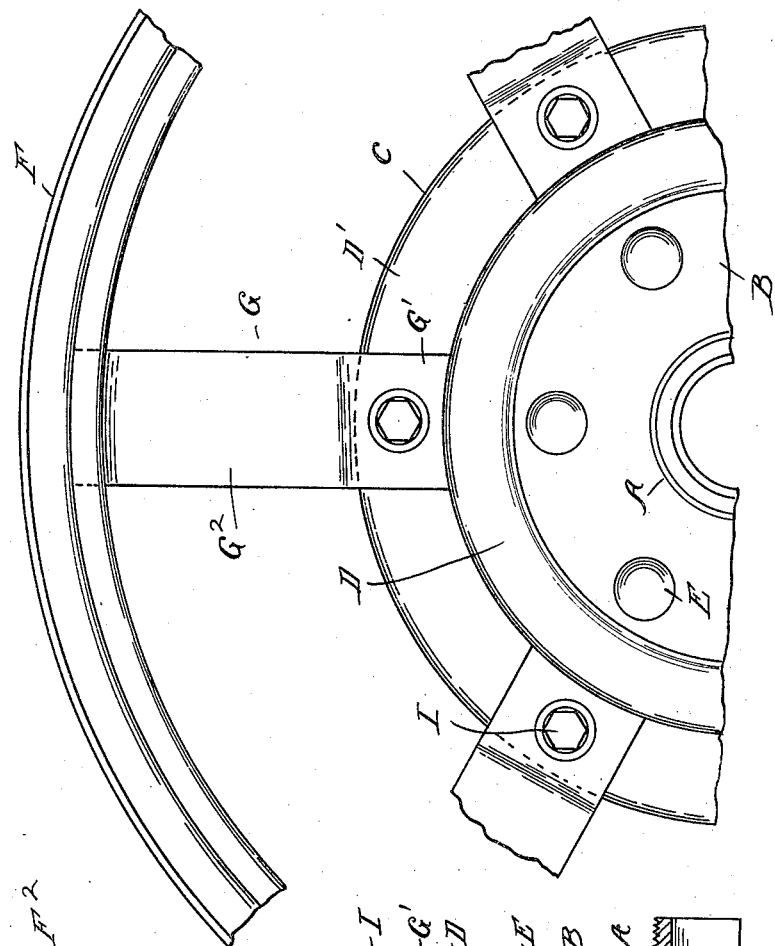
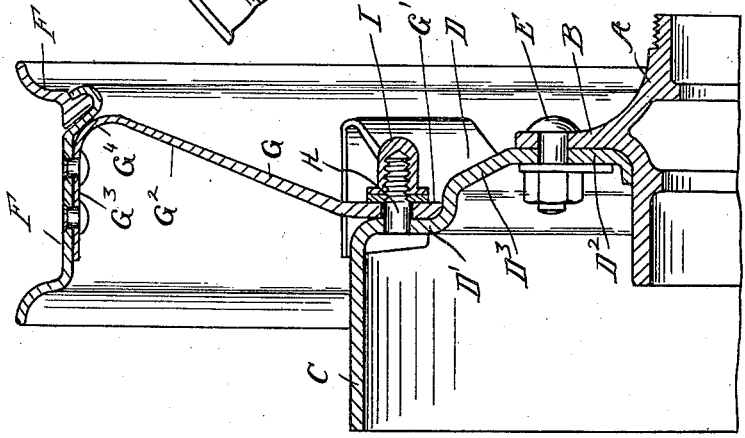
Inventor
Alden L. Putnam
By Whittemore Hulbert Whittemore
+Belknap
Attorneys

Patented Dec. 28, 1926.

1,612,050

UNITED STATES PATENT OFFICE.

ALDEN L. PUTNAM, OF LANSING, MICHIGAN, ASSIGNOR, BY MESNE ASSIGNMENTS, TO MOTOR WHEEL CORPORATION, OF LANSING, MICHIGAN, A CORPORATION OF MICHIGAN.

VEHICLE WHEEL.

Application filed April 7, 1924. Serial No. 704,826.

The invention relates to vehicle wheels and more particularly to constructions adapted for use as front or steering wheels and provided with brakes. In the present state of the art it is usual in front wheel brake constructions to make the connection between the brake drum and the hub independent of the connection between the rim and hub. This in the case of disk wheels increases the amount of metal and consequently the weight of the construction. It is also quite common to provide the wheels with demountable rims involving further material and added weight.

It is the object of the present invention to simplify the construction and reduce the weight by utilizing the brake drum to the extent of its radius as the sole connecting means between the hub and the rim. It is a further object to form the remainder of the connection between the hub and the rim by means demountably secured to the drum and thus to dispense with the use of a demountable rim. Still further, it is an object to greatly lighten the structure by forming this demountable connection of spoke members, dispensing with the continuous web of a disk wheel. Thus the complete structure combines all of the advantages of constructions heretofore used in a simpler, cheaper and lighter structure.

In the drawings:

Figure 1 is a cross section through a portion of the wheel of my improved construction;

Figure 2 is a side elevation thereof.

A is a hub of any suitable construction provided with a radially outwardly extending flange B. C is a brake drum having a radially inwardly extending web D, preferably fashioned with outer and inner portions D' and $D^2$ in parallel planes and an obliquely extending portion $D^3$ connecting the same. The portion D is secured to the flange B by bolts E or other suitable securing devices. F is a rim preferably one constructed for direct engagement of the tire, and G is a connection between said rim and the outer portion D' of the brake drum.

To permit of demounting the rim F the member G is detachably secured to the brake drum, preferably by the bolts or studs H and the clamping nuts I. Also the member G is preferably formed of a series of radially extending spokes, which at their inner ends are secured by the bolts H and nuts I and at their outer ends are rigidly attached to the rim. As specifically shown, the spokes G have a portion G' parallel to the portion D' and clamped thereagainst by the bolts H and nuts I. Extending outward from the portion G' is an obliquely extending portion $G^2$, which is preferably of tapering cross section, and at its outer end the portion $G^2$ is bent laterally to lie parallel at $G^3$ to the rim F to which it is riveted or otherwise secured. The bend $G^4$ between the portions $G^2$ and $G^3$ is reinforced by lying adjacent to the inwardly extending groove portion of the rim F, which forms the means of securing the detachable flange $F^2$.

With the construction described the web D of the brake drum C forms not only the support for said drum, but also the sole connection between the hub and the outer member G. The oblique portions $D^3$ and $G^2$ twice cross the central plane of the wheel and serve to laterally strengthen the same. However, there is nothing to prevent lateral flexing of the wheel under abnormal stresses and its recovery due to the resiliency of the material used.

In exchanging tires the rim F may be readily demounted by detaching the nuts I and disengaging the spokes G from the bolts H. As these spokes are very short and occupy only a fraction of the space between the drum and the rim, they add very little to the weight of the rim over that of the usual demountable construction. Thus the structure as a whole is lighter, simpler and cheaper to build than the usual constructions of wheels for 4-wheel brakes.

What I claim as my invention is:

1. In a vehicle wheel, the combination with a hub, of a brake drum having a web portion directly secured to said hub, the outer portion of said web being offset with reference to the plane of impact, a rim, and means inclined to the plane of impact extending between said rim and the outer portion of said web demountably secured to the latter.

2. In a wheel, the combination with a hub, of a brake drum having a web fashioned to form portions in parallel planes connected by an obliquely extending portion, a flange on said hub to which the inner of said parallel portions is secured, a rim and members inclined with reference to the axis of the wheel and each extending inwardly from said rim terminating in a portion parallel to the outer of said parallel portions of the web, and means for demountably securing said last mentioned parallel portions to each other.

3. In a wheel, the combination with a hub, a rim and a brake drum, of members extending inwardly from said rim demountably secured to said brake drum, and a portion integral with said brake drum extending radially inward and connected to said hub, said portion forming the sole connection between said members extending inwardly from the rim and the hub and having oppositely extending off-sets at said points of connection.

4. In a wheel, the combination with a hub, a brake drum and a rim, of members extending inwardly from said rim demountably secured to said brake drum, and a web integral with said brake drum extending inwardly from said demountable connection and forming the sole connection between the same and the hub said web having oppositely off-set portions at said points of connection.

5. In a wheel, the combination with a hub, a brake drum and a rim, of a web integral with said brake drum extending radially inward and secured to said hub, and a series of spokes extending radially inward from said rim and secured to said brake drum.

6. In a wheel, the combination with a hub, a brake drum and a rim, of a web extending between said drum and hub and secured to the latter, and a series of radial spokes extending inward from said rim and demountably attached to said brake drum.

In testimony whereof I affix my signature.

ALDEN L. PUTNAM.